United States Patent
Pöhnl et al.

(10) Patent No.: US 12,131,203 B2
(45) Date of Patent: *Oct. 29, 2024

(54) DETERMINISTIC REPLAY OF EVENTS BETWEEN SOFTWARE ENTITIES

(71) Applicant: APEX.AI, INC., Palo Alto, CA (US)

(72) Inventors: Michael Pöhnl, Wurmberg (DE); Alban Tamisier, Buchloe (DE); Misha Shalem, Zichron Yaakov (IL)

(73) Assignee: APEX.AI, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,010

(22) Filed: Jun. 16, 2022

(65) Prior Publication Data

US 2023/0032237 A1 Feb. 2, 2023

Related U.S. Application Data

(63) Continuation of application No. 17/389,077, filed on Jul. 29, 2021, now Pat. No. 11,366,705.

(51) Int. Cl.
| | |
|---|---|
| *G06F 9/54* | (2006.01) |
| *G06F 3/06* | (2006.01) |
| *G06F 9/48* | (2006.01) |
| *G06F 11/34* | (2006.01) |
| *G06F 11/36* | (2006.01) |

(52) U.S. Cl.
CPC ............ *G06F 9/542* (2013.01); *G06F 9/4887* (2013.01); *G06F 9/546* (2013.01); *G06F 11/3414* (2013.01); *G06F 11/362* (2013.01); *G06F 11/3636* (2013.01); *G06F 3/0659* (2013.01); *G06F 9/4875* (2013.01); *G06F 11/3476* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 5,881,315 A | 3/1999 | Cohen | |
| 7,440,885 B2 * | 10/2008 | Garcia | .................. G06F 30/331 703/23 |
| 8,370,395 B1 | 2/2013 | Gupta et al. | |
| 8,893,139 B2 | 11/2014 | Strom et al. | |
| 8,943,009 B2 | 1/2015 | Etzion et al. | |
| 10,095,543 B1 | 10/2018 | Griffin et al. | |
| 10,838,779 B1 * | 11/2020 | Yue | ..................... G06F 16/9024 |

(Continued)

OTHER PUBLICATIONS

Extended European Search Report for EP Application No. 22179446.4 dated Dec. 14, 2022 (8 pages).

(Continued)

*Primary Examiner* — Abu Zar Ghaffari
(74) *Attorney, Agent, or Firm* — Procopio, Cory, Hargreaves & Savitch LLP

(57) ABSTRACT

In current frameworks, replays of events (e.g., data communications) between software entities are non-deterministic and unreproducible. In an embodiment, as events are replayed, software entities, stimulated by those events, are queued according to a queuing strategy and executed from the queue. In an alternative embodiment, as software entities are executed, the events, output by those software entities, are queued according to a queuing strategy and played from the queue.

15 Claims, 8 Drawing Sheets

(56) References Cited

U.S. PATENT DOCUMENTS

| | | | |
|---|---|---|---|
| 2003/0046626 A1* | 3/2003 | Hand, Jr. | H04M 3/22 |
| | | | 714/E11.208 |
| 2004/0205773 A1 | 10/2004 | Carcido et al. | |
| 2005/0166186 A1* | 7/2005 | Cabrera | G06F 9/4498 |
| | | | 717/124 |
| 2006/0053211 A1* | 3/2006 | Kornerup | G06F 11/323 |
| | | | 709/217 |
| 2008/0086730 A1* | 4/2008 | Vertes | G06F 11/1438 |
| | | | 714/E11.204 |
| 2009/0119549 A1 | 5/2009 | Vertes et al. | |
| 2009/0144742 A1 | 6/2009 | Subhraveti et al. | |
| 2009/0183170 A1 | 7/2009 | Gharpure | |
| 2010/0251031 A1 | 9/2010 | Nieh et al. | |
| 2011/0040549 A1* | 2/2011 | Ciarallo | G06F 30/33 |
| | | | 703/17 |
| 2012/0066694 A1 | 3/2012 | Jennings | |
| 2012/0089700 A1* | 4/2012 | Safruti | H04L 67/568 |
| | | | 709/217 |
| 2014/0181107 A1 | 6/2014 | Coburn et al. | |
| 2015/0106825 A1 | 4/2015 | Abbas et al. | |
| 2018/0191597 A1 | 7/2018 | Nageshappa et al. | |
| 2019/0004930 A1 | 1/2019 | Mola | |
| 2019/0308104 A1 | 10/2019 | Nicolades | |
| 2020/0073978 A1* | 3/2020 | Dain | G06F 16/2365 |
| 2020/0159570 A1* | 5/2020 | Askeland | H04W 4/40 |
| 2020/0218584 A1* | 7/2020 | Punathil | G06F 9/542 |
| 2020/0358753 A1 | 11/2020 | Beckhardt et al. | |
| 2021/0072964 A1* | 3/2021 | Bequet | G06F 16/90344 |
| 2022/0374265 A1* | 11/2022 | Davis | G06F 11/0757 |

OTHER PUBLICATIONS

Netzer R H B et al.: "Critical-path-based message logging for incremental replay of message-passing programs", Distributed Computing Systems, 1994, Proceedings of the 14th International Conference On Pozman, Poland Jun. 21-24, 1994, Los Alamitos, CA, USA, IEEE Comput. Soc, Jun. 21, 1994 (Jun. 21, 1994), XP010099507, pp. 404-413.

Netzer R H B et al.: "Adaptive message logging for incremental program replay", IEEE Parallel and Distributed Technology: Systems and Applications, XX, XX, vol. 1, No. 4, Nov. 1, 1993 (Nov. 1, 1993), XP011420362, pp. 32-39.

Extended European Search Report mailed Aug. 23, 2024 in European Application No. 24158494.5, 12 pages.

* cited by examiner

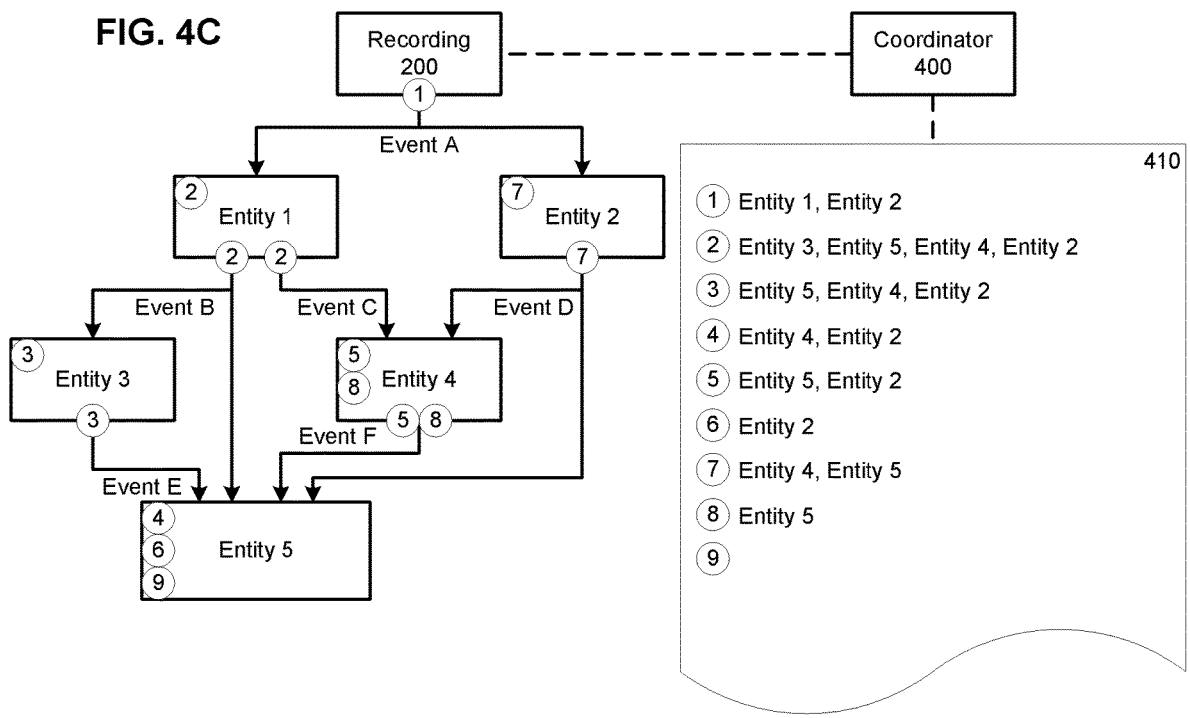

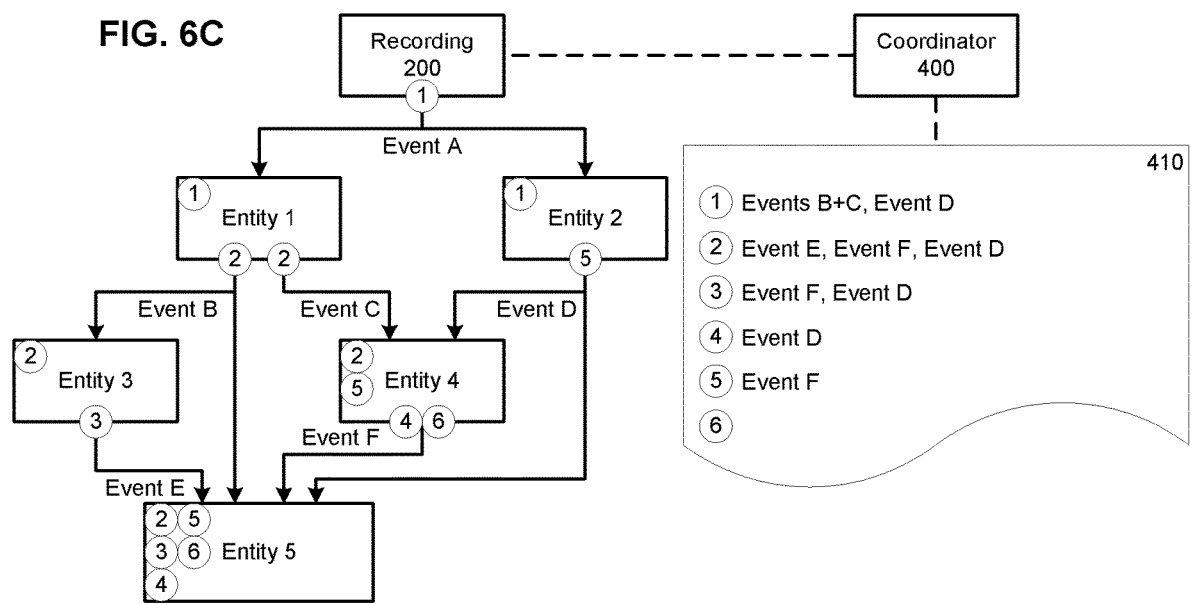

DETERMINISTIC REPLAY OF EVENTS BETWEEN SOFTWARE ENTITIES

CROSS-REFERENCE TO RELATED APPLICATIONS

The present application is a continuation of U.S. patent application Ser. No. 17/389,077, filed on Jul. 29, 2021, which is hereby incorporated herein by reference in its entirety as if set forth in full.

BACKGROUND

Field of the Invention

The embodiments described herein are generally directed to replaying data, and, more particularly, to deterministic replay of events (e.g., data communications) between software entities.

Description of the Related Art

Many frameworks that are used to develop robotics or automotive systems provide functionality to record and replay the data communications between software entities in the systems. Examples of such frameworks include, without limitation, the Robotic Operating System (ROS), the Automotive Data and Time-Triggered Framework (ADTF), and the enhanced Communication Abstraction Layer (eCAL).

The data being replayed may be either a recording of inputs in a real system or synthetic data that were generated for stimulation of a real system. Replaying such data to stimulate a system may be useful to debug a specific state of a system from which the data was recorded (e.g., a specific situation experienced by an autonomous or semi-autonomous vehicle), test the system for its ability to analyze certain situations (e.g., corner cases that are difficult to find in the real world), establish repeatable tests (e.g., to be executed in a continuous integration pipeline to check if each iteration of the system's software reacts in a predefined manner when processing given inputs), accelerate the development of software for specific portions of the system (e.g., instead of having to run the complete system, specific data may be selected that relates to a specific portion of the system, such as data representing rain at night for a weather response system in a vehicle), and/or the like.

In many cases, there are different levels of replay possible, from replaying only the data for a single software entity to replaying all of the data for a huge system with hundreds of software entities. Normally, the messages in recorded data communications between software entities are replayed in the order of their occurrence within the recording. If included in the messages, timestamps can be used to replay the messages in chronological order. Often, the speed of replay can be slowed down or sped up with respect to real time.

When replaying the data, one or several software entities may be stimulated such that they can execute in one or parallel threads of execution. However, the hardware environment on which the data is being replayed may be different than the hardware environment on which the data was recorded. For example, data may be recorded from an electronic control unit (ECU) in a vehicle, but replayed on a developer's laptop or in a cloud-based environment. This difference in the hardware environments, as well as potential changes in the software in the development environment over the software in the recording environment, can cause the runtime behavior during the replay to differ from the runtime behavior during recording. The runtime behavior between different replays may also differ, for example, because background tasks running on the same operating system may affect the timing of tasks in the replay. This non-deterministic runtime behavior can lead to variations in the order of execution for the software entities, variations in the start and end points for the execution of a software entity relative to the start of the replay, variations in the timings at which software entities output or consume messages relative to the start of the replay, variations in the inputs that software entities process with respect to replayed messages, variations in the inputs that software entities process with respect to messages sent by other software entities, variations in the outputs of software entities, and/or the like. As a consequence of all of these variations, the results of replays are not reproducible. This non-deterministic runtime behavior of replays increases as the number of software entities and parallel threads of execution increase.

In addition, the data-driven execution that is typical for robotics and modern automotive applications results in more indeterminism than would normally exist in purely time-driven applications. This is because messages are sent by software entities at varying time points. Consequently, software entities, receiving and stimulated by those messages, will begin execution at varying start times. Often, a set of messages from several sending software entities is consumed from a communication middleware when the execution of a receiving software entity starts. As a result of the indeterminism described above, this set of messages is undefined, and therefore, the output produced from these messages by the software entity is also undefined.

Consequently, it is difficult, if not impossible, to establish reproducible tests within conventional frameworks. This difficulty increases when the system being tested implements a graph of software entities that are executed on a multi-core processor. In other words, in this case, advanced technology and efficiency in the hardware environment can hinder the reproducibility of replays.

SUMMARY

Accordingly, systems, methods, and non-transitory computer-readable media are disclosed to provide deterministic replay of events that may be reproducible and suitable for all hardware environments, regardless of the number of software entities, the number of threads of execution, and the usage of multi-core processors.

In a first embodiment, a method is disclosed that comprises using at least one hardware processor to replay a recording of events between a plurality of software entities within a system by, for each of one or more events in the recording: play the event; queue all software entities that are stimulated by the event in a queue; and, until the queue is empty, remove and execute a software entity at a front of the queue, play all events outputted by the executed software entity, and queue all software entities that are stimulated, by the played events outputted by the executed software entity, in the queue. Each playing of an event may comprise sending a message representing the event. The method may further comprise using the at least one hardware processor to ensure that no events are played during execution of any of the plurality of software entities. The method may further comprise using the at least one hardware processor to ensure that no software entity is executed during execution of any other one of the plurality of software entities. The system may be a subsystem of a vehicle or a robot.

Each queuing of a software entity in the queue may comprise: when the software entity does not already exist at any position within the queue, inserting the software entity into the queue, and, when the software entity already exists at a position within the queue, not inserting a duplicate of the software entity into the queue. Inserting the software entity into the queue may comprise inserting the software entity at a back of the queue. Alternatively, inserting the software entity into the queue may comprise inserting the software entity at the front of the queue.

Each queuing of a software entity in the queue may comprise inserting the software entity into the queue, regardless of whether or not the software entity already exists at a position within the queue. Inserting the software entity into the queue may comprise inserting the software entity at a back of the queue. Alternatively, inserting the software entity into the queue may comprise inserting the software entity at the front of the queue.

In a second embodiment, a method is disclosed that comprises using at least one hardware processor to replay a recording of events between a plurality of software entities within a system by, for each of one or more events in the recording: play the event; execute all software entities that are stimulated by the event; queue all events outputted by any of the executed software entities in a queue; and, until the queue is empty, remove and play an event at a front of the queue, execute all software entities that are stimulated by the played event that was removed from the front of the queue, and queue all events outputted by any of the executed software entities that are stimulated by the played event that was removed from the front of the queue. Each playing of an event may comprise sending a message representing the event. Each queuing of an event in the queue may comprise: when the event does not already exist at any position within the queue, inserting the event into the queue, and, when the event already exists at a position within the queue, not inserting a duplicate of the event into the queue. Alternatively, each queuing of an event in the queue may comprise inserting the event into the queue, regardless of whether or not the event already exists at a position within the queue. Executing all software entities, that are stimulated by the event or stimulated by the played event that was removed from the front of the queue, may comprise executing all of the software entities in parallel. The system may be a subsystem of a vehicle or a robot.

These methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 4A-4C illustrate variations in the queuing strategy for the first embodiment of the algorithm, according to embodiments;

FIGS. 6A-6C illustrate variations in the queuing strategy for the second embodiment of the algorithm, according to embodiments.

DETAILED DESCRIPTION

In an embodiment, systems, methods, and non-transitory computer-readable media are disclosed for deterministic replay of events between software entities. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

Figure 1:
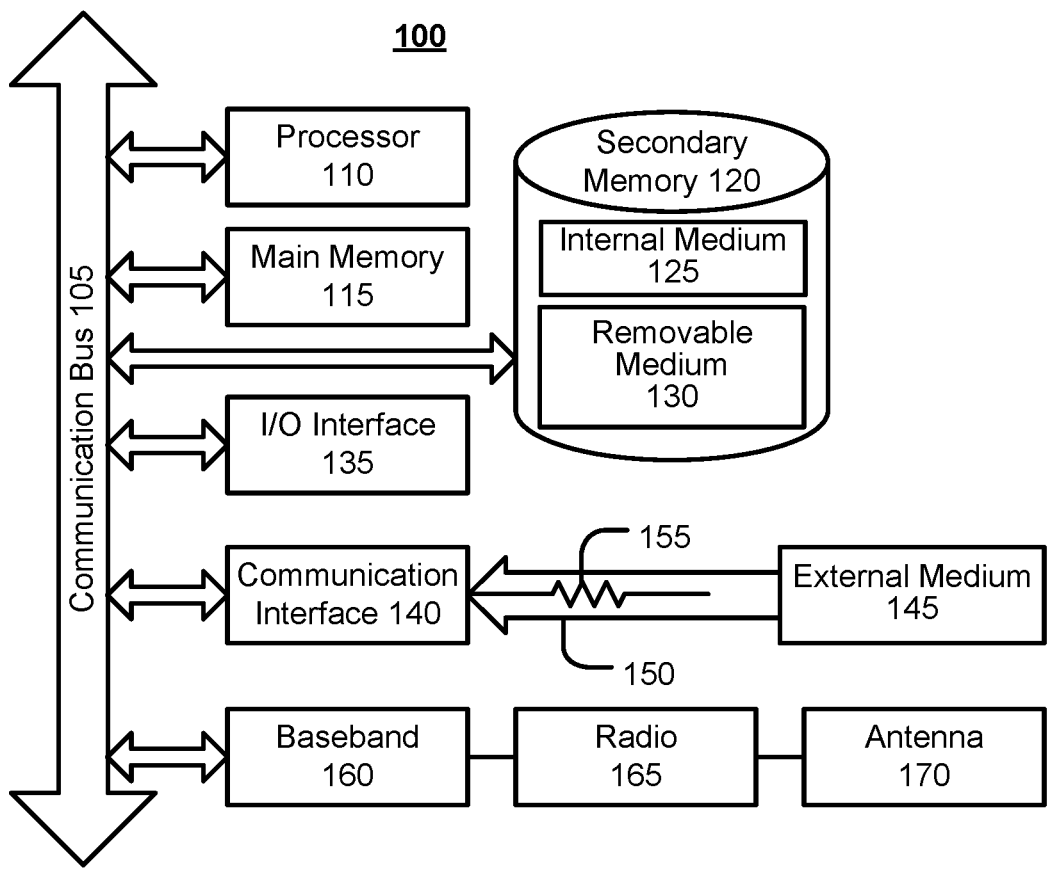
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used as or in conjunction with one or more of the functions, processes, or methods described herein (e.g., to store and/or execute one or more software entities, a coordinator, or other software modules described herein). System 100 can be a server, a conventional personal computer, a control system in a robot or vehicle, or any other processor-enabled device. Other computer systems and/or architectures may be also used, as will be clear to those skilled in the art.

System 100 preferably includes one or more processors 110. Processor(s) 110 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, California.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 100 preferably includes a main memory 115 and may also include a secondary memory 120. Main memory 115 provides storage of instructions and data for programs executing on processor 110, such as one or more of the functions and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., disclosed software modules) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or data may be transferred to system 100, over one or more networks (e.g., including the Internet), from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, comprising one or more software modules) is stored in main memory 115 and/or secondary memory 120. Computer-executable code can also be received via communication interface 140 and stored in main memory 115 and/or secondary memory 120. Such computer-executable code, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 100 may also include optional wireless communication components that facilitate wireless communication over a voice network and/or a data network. The wireless communication components comprise an antenna system 170, a radio system 165, and a baseband system 160. In system 100, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 decodes the signal and converts it to an analog signal. Then the signal is amplified and sent to a speaker. Baseband system 160 also receives analog audio signals from a microphone. These analog audio signals are converted to digital signals and encoded by baseband system 160. Baseband system 160 also encodes the digital signals for transmission and generates a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 is also communicatively coupled with processor(s) 110. Processor(s) 110 may have access to data storage areas 115 and 120. Processor(s) 110 are preferably configured to execute instructions (i.e., computer programs, such as the disclosed application, or software modules) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. Process Overview

Embodiments of processes for deterministic replay of events between software entities will now be described in detail. It should be understood that the described processes may be embodied in one or more software modules that are executed by one or more hardware processors (e.g., processor 110), for example, as a computer program or software package. The described processes may be implemented as instructions represented in source code, object code, and/or machine code. These instructions may be executed directly by hardware processor(s) 110, or alternatively, may be executed by a virtual machine operating between the object code and hardware processors 110.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Introduction

Embodiments of an algorithm are disclosed that ensure that every replay of recorded events between software entities leads to the same result. The result of the replays may differ from the result of the system on which the data was recorded, if certain aspects, such as the internal states of the software entities, are not replicated. However, any replay will be reproducible for a fixed set of software entities that perform fixed calculations and have fixed interfaces and connections (e.g., with other software entities). This enables reproducible testing that is independent of the hardware environment and runtime behavior of the system executing the replay.

In an embodiment, this reproducibility is achieved by using a coordinator that controls the inputs to, and the order of execution of, the software entities that are stimulated by the replayed events. Indeterminism may be avoided by ensuring that no messages are sent to a software entity while the software entity is executing, and by ensuring that there is a defined order in which software entities are executed. This may be implemented by either: (1) having the coordinator queue software entities that are ready to be executed, to ensure that only one software entity is executed at a time and that there is a defined order in which the software entities are stimulated when multiple software entities are stimulated; or (2) having the coordinator queue events that are ready to be played (e.g., sent or forwarded), to ensure that there is a defined order in which events output by parallel executing software entities are sent to other software entities and that no events are sent while software entities are being executed.

In an embodiment, the software entities may be executed on a single system 100 (e.g., by one or more processors 110, which may include one or more multi-core processors) or may be distributed across a plurality of systems 100 that communicate with each other (e.g., via wired or wireless communication). In addition, the coordinator may be a software module that executes on the same system 100 as one or more or all of the software entities, or may execute on a system 100 that is separate from, and communicates with (e.g., via wired or wireless communication), the system or systems 100 on which the software entities are executed. In any case, the coordinator stimulates the software entities, with input events, according to the disclosed algorithm.

The algorithm operates on software entities that are stimulated by events, which are recorded in the data being replayed. These events may comprise the receipt of a message that was sent by another software entity or may be a timer event (e.g., the expiration of a timer). The stimulation of a software entity may comprise executing one or more modules of the software entity to process input events (e.g., messages), which may potentially generate additional events (e.g., messages) that are sent to and consumed by other software entities (e.g., by sending a message from the stimulated software entity to the other software entities), thereby stimulating the other software entities, which may generate additional events that stimulate further software entities, and so on and so forth.

In an embodiment, the coordinator controls when events are played (e.g., sent) and/or when software entities are executed (i.e., process stimulating input events). For example, the coordinator may intercept all events that are output by executing software entities, such that those events are not sent by the executing software entities to any other software entities. Then, the coordinator may play (e.g., send) those events at a time of its choosing according to the algorithm. Additionally or alternatively, the coordinator may communicate with the software entities to control when the software entities execute (e.g., process any waiting input events). Thus, the coordinator may ensure that software entities only execute at a time of its choosing according to the algorithm.

Figure 2:
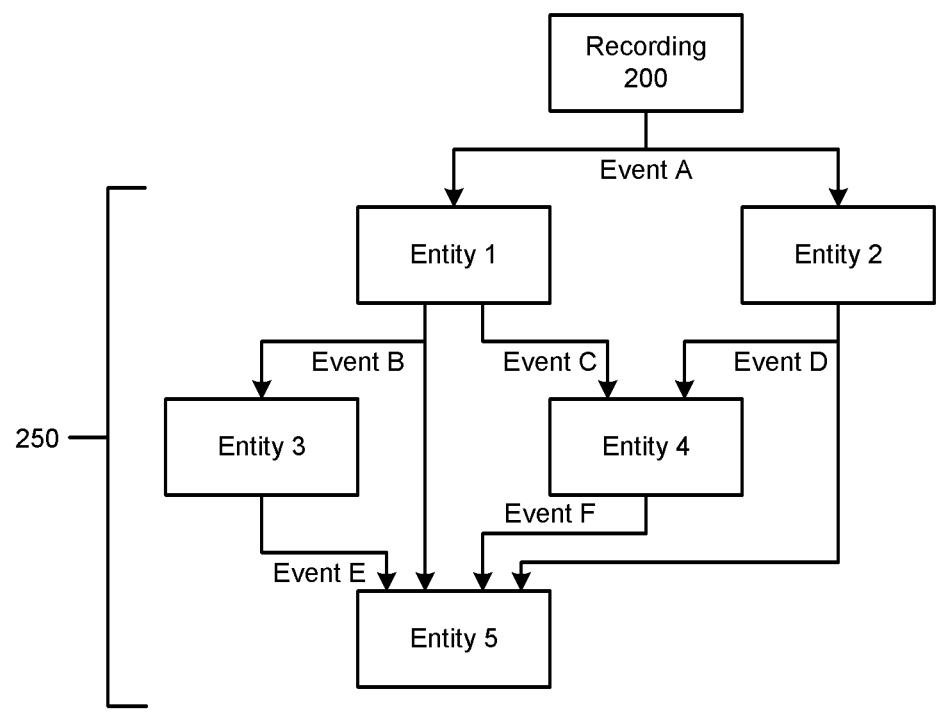
FIG. 2 illustrates an example graph, representing the behavior of a system being replayed, according to an embodiment.

The behavior or pattern of stimulations in a system may be visually expressed as a graph in which the software entities are nodes and the events are edges. FIG. 2 illustrates an example of a graph, representing the behavior of a system being replayed, according to an embodiment. This example graph will be utilized herein to explain the differences between different embodiments of the algorithm for replaying recorded data 200 in a system 250. For simplicity, the software entities will simply be referred to as "Entity [numeral]" and the events will simply be referred to as "Event [letter]". In this example, recording 200 begins with an Event A that is input to Entity 1 and Entity 2. Entity 1 is stimulated by Event A to output Event B and Event C, and Entity 2 is stimulated by Event A to output Event D. Event B stimulates Entity 3 to output Event E, and Events C and D stimulate Entity 4 to output Event F. Entity 5 is stimulated by Events B, D, E, and F, but does not output an event (or does output an event, but the event is not recorded in recording 200 or is not being replayed).

It should be understood that each software entity may comprise a software module that is configured to perform a discrete function based on one or more inputs. For instances, the software entities that were recorded and/or are being stimulated during replay may drive a sensor system or control system of a robot or vehicle (e.g., an autonomous or semi-autonomous vehicle). As one non-limiting example, Entity 1 and Entity 2 may be separate filters that each receive a message, comprising a point cloud, from separate sensors. Entity 1 and Entity 2 may each preprocess the respective point cloud to remove useless information or noise, and output the preprocessed point cloud as Event C and Event D, respectively. Entity 4 may perform sensor fusion to fuse the point clouds in Event C and Event D into a composite point cloud, and output the composite point cloud as Event F. Entity 5 may receive Event F (e.g., a message comprising the composite point cloud) and apply clustering to the composite point cloud. In this case, system 250 may represent a portion of the perception system in the driving system of an autonomous vehicle. It should be understood that a full system, such as the driving system of an autonomous vehicle, may comprise many such subsystems, representing different functions (e.g., processing point clouds, obtaining velocity and other vehicle information, managing objects lists, etc.), with each subsystem comprising many software entities and spawning many events. Replay may be performed for the entire system or for only a portion of interest in the system (e.g., one or more subsystems).

2.2. First Embodiment of Algorithm

Figure 3:
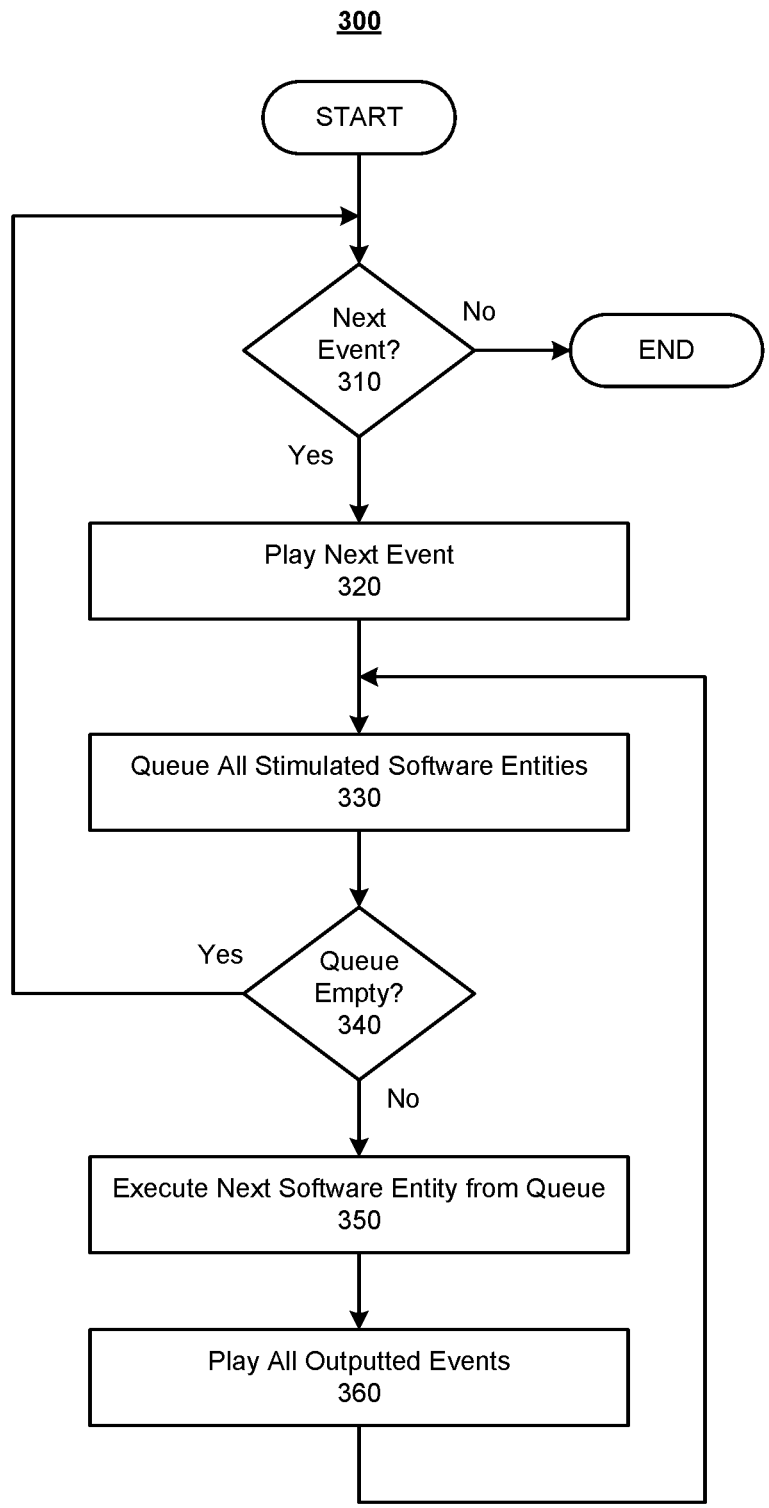
FIG. 3 illustrates an algorithm for replaying data by queuing stimulated software entities, according to a first embodiment.

FIG. 3 illustrates an algorithm 300 for replaying data by queueing stimulated software entities, according to a first embodiment. It should be understood that algorithm 300 may be executed by a coordinator that coordinates the execution of the software entities and playing of events (e.g., sending events to the software entities), and manages a queue of the stimulated software entities. The coordinator may be executed by one or more processors 110 of a system 100 that is the same as, or communicates with, system 250 executing the software entities.

Initially, the coordinator may learn the topology of the system to be replayed, including the software entities in the system and their connections to the events (e.g., messages sent via a communication middleware) that are being replayed. In other words, the coordinator may ingest the graph of the system, as visualized in an example in FIG. 2. The identities of the software entities may be obtained or constructed from a configuration file that is input to, or accessed by, the coordinator. Alternatively, the coordinator may query this information from the system to be replayed, using any appropriate mechanism. Similarly, the events that are input to and/or output by each software entity may also be obtained from the configuration file or queried from the system to be replayed.

In subprocess 310, algorithm 300 determines whether or not there is a next event to replay. When there is a next event to replay (i.e., "Yes" in subprocess 310), algorithm 300 plays the next event in subprocess 320. Otherwise, if there is no next event to replay (i.e., "No" in subprocess 310), algorithm 300 may end. Thus, it should be understood that algorithm 300 plays each event in recording 200, including any initial events and any events that are output by software entities during replay, until there are no more events to be played.

In subprocess 320, algorithm 300 plays the next event. Playing an event may comprise sending or forwarding the event as a message to any software entities that consume the event as input. The event may be sent to specific software entities that consume the event or may be broadcast to all software entities, which may themselves decide whether or not to consume the event. In any case, any given event may be consumed by one software entity, a plurality of software entities, or no software entity. A software entity that consumes an event is "stimulated" by that event as an input.

In subprocess 330, algorithm 300 adds all software entities (if any) that are stimulated by the event, played in subprocess 320, to a queue. It should be understood that this does not require the actual software entity to be added to a queue. Rather, when a software entity is discussed herein as being added or inserted into a queue, this encompasses a situation in which an identifier of the software entity or reference to the software entity is added or inserted into the queue. The stimulated software entities may be added to the queue according to various strategies. A few of these strategies are discussed below, with reference to FIGS. 4A-4C, as variants of the first embodiment. The key point is that the queue provides an ordering of the stimulated software entities that is reproducible across a plurality of replays. It should also be understood that, in some cases, the event, played in subprocess 320, will not stimulate any software entities, such that no software entities are inserted into the queue in subprocess 330.

In subprocess 340, algorithm 300 determines whether or not the queue is empty, or conversely, whether or not there are any stimulated software entities remaining in the queue. If the queue is empty (i.e., "Yes" in subprocess 340), algorithm 300 returns to subprocess 310 to determine whether or not any events remain in recording 200. Otherwise, if at least one stimulated software entity remains in the queue (i.e., "No" in subprocess 340), algorithm 300 executes the next software entity in the queue in subprocess 350.

In subprocess 350, the next software entity in the queue is removed from the queue and executed. In particular, the software entity is executed to process the event that was played in subprocess 320 as an input. For example, the software entity may parse the data in a message representing the input event, and process that data to produce zero, one, or a plurality of output events. Each output event may be represented as another message that is sent to one or more other software entities. The coordinator may control execution of any given software entity in system 250 by calling or otherwise triggering the software entity using the input event(s), and may receive the output events in response.

In subprocess 360, algorithm 300 sends all of the event(s) (if any) outputted by the software entity, executed in subprocess 350, to one or more other software entities. For example, these event(s) may be specifically forwarded to one or more other software entities, or may be broadcast to a plurality of software entities (e.g., all software entities in system 250). Then, algorithm 300 returns to subprocess 330 to queue any software entities that are stimulated by the event(s) sent in subprocess 360. It should be understood that, in some cases, the software entity, executed in subprocess 350, will output no events, such that no events are sent in subprocess 360.

In summary, in this first embodiment, represented by algorithm 300, the software entities that are to be executed (i.e., were stimulated by played events) are queued. The order in which software entities are queued may be implemented according to a variety of strategies, as long as the same order will be reproduced in every replay. When a software entity is executed, it may output additional events that are sent to and stimulate other software entities. Each stimulated software entity is then added to the queue according to the chosen strategy. When the queue is empty, the coordinator triggers the replay of the next event from the recording. If a software entity is stimulated again by a second event, while it is already queued as a result of a prior stimulation by a first event, the software entity can either be inserted into the queue again (i.e., to be executed a first time for the first event, and a second time for the second event) or not inserted again such that the software entity only exists at a single position in the queue at a time (i.e., to be executed only once to simultaneously process both the first event and the second event).

Figure 4A:
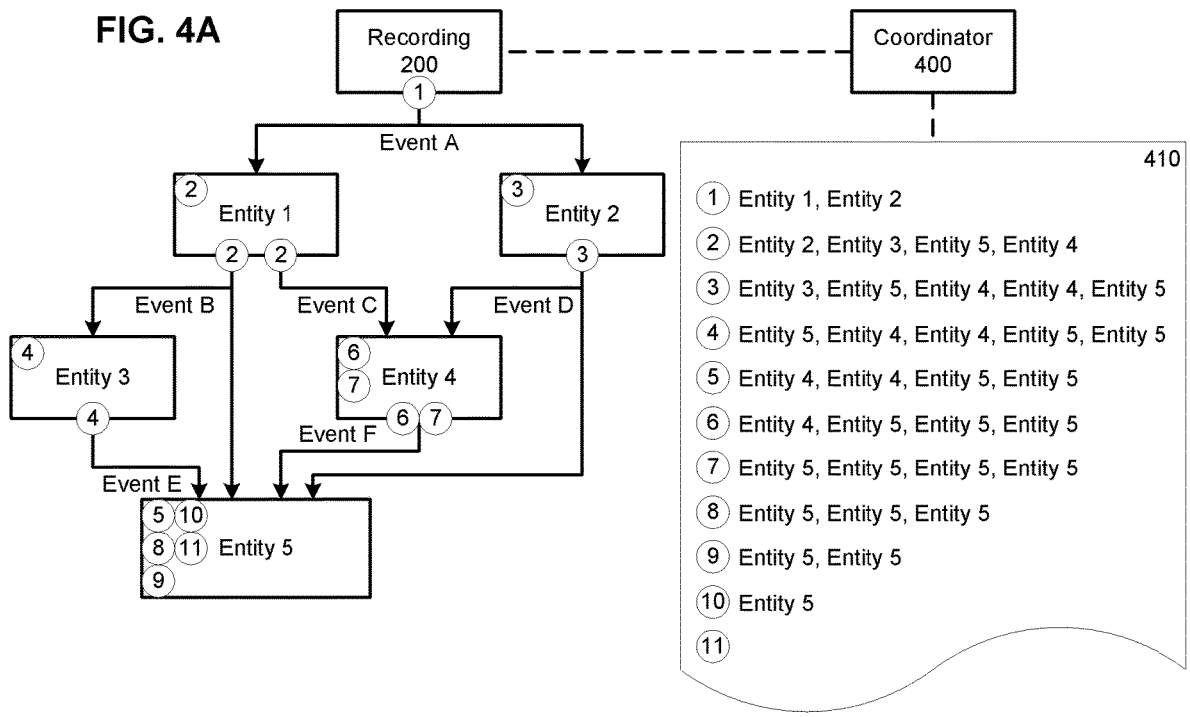
Figure 4B:
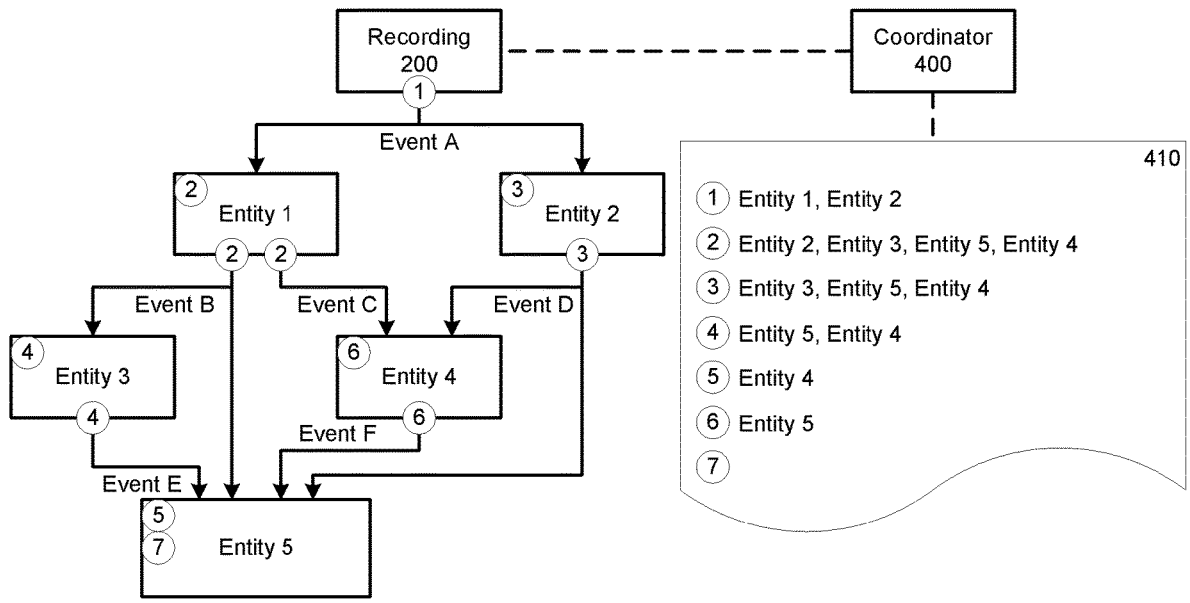

Variations in the strategies for adding software entities to the queue in algorithm 300 are illustrated in FIGS. 4A-4C. However, it should be understood that these strategies are non-limiting examples, and that other strategies are possible.

2.2.1. First Variant of First Embodiment

FIG. 4A illustrates the operation of algorithm 300, according to a first variant of the queuing strategy. In this first variant, coordinator 400 inserts each newly stimulated software entity at the back of queue 410, regardless of whether or not the software entity already exists at another position in queue 410. Thus, each and every event leads to the queueing and execution of all software entities that are stimulated by that event. Accordingly, coordinator 400 replays recording 200 as follows:

(1) Initially, Event A is played from recording 200 (e.g., subprocess 320). In other words, coordinator 400 sends Event A. Event A stimulates Entity 1 and Entity 2. Thus, coordinator 400 inserts Entity 1 and Entity 2 into queue 410 (e.g., subprocess 330). It should be understood that in each instance, described herein, in which an event is played, the event may be played by coordinator 400. Alternatively, the event may be played without the assistance of coordinator 400 (e.g., simply by execution of the software entity outputting the event, for example, as it might during normal operation).

(2) Next, coordinator 400 executes Entity 1 from the front of queue 410 (e.g., subprocess 350). As a result of this execution, Entity 1 outputs Event B and Event C, which are played (e.g., subprocess 360). In other words, Event B and Event C are sent as messages. Event B stimulates Entity 3 and Entity 5. Event C stimulates Entity 4. Thus, coordinator 400 inserts Entity 3, Entity 5, and Entity 4 at the back of queue 410 (e.g., subprocess 330).

(3) Next, coordinator 400 executes Entity 2 from the front of queue 410 (e.g., subprocess 350). As a result of this execution, Entity 2 outputs Event D, which is played (e.g., subprocess 360). In other words, Event D is sent as a message. Event D stimulates Entity 4 and Entity 5. Thus, coordinator 400 inserts Entity 4 and Entity 5 at the back of queue 410 (e.g., subprocess 330).

(4) Next, coordinator 400 executes Entity 3 from the front of queue 410 (e.g., subprocess 350). As a result of this execution, Entity 3 outputs Event E, which is played (e.g., subprocess 360). In other words, Event E is sent as a message. Event E stimulates Entity 5. Thus, coordinator 400 inserts Entity 5 at the back of queue 410 (e.g., subprocess 330).

(5) Next, coordinator 400 executes Entity 5 from the front of queue 410 (e.g., subprocess 350). This execution of Entity 5 does not output any event. Thus, no insertions are made to queue 410.

(6) Next, coordinator 400 executes Entity 4 from the front of queue 410 (e.g., subprocess 350). As a result of this execution, Entity 4 outputs Event F, which is played (e.g., subprocess 360). In other words, Event F is sent as a message. Event F stimulates Entity 5. Thus, coordinator 400 inserts Entity 5 at the back of queue 410 (e.g., subprocess 330).

(7) Next, coordinator 400 executes Entity 4 from the front of queue 410 (e.g., subprocess 350). As a result of this execution, Entity 4 outputs Event F, which is played (e.g., subprocess 360). In other words, Event F is sent as a message. Event F stimulates Entity 5. Thus, coordinator 400 inserts Entity 5 at the back of queue 410 (e.g., subprocess 330).

(8) Next, coordinator 400 executes Entity 5 from the front of queue 410 (e.g., subprocess 350). This execution of Entity 5 does not output any event. Thus, no insertions are made to queue 410.

(9) Next, coordinator 400 executes Entity 5 from the front of queue 410 (e.g., subprocess 350). This execution of Entity 5 does not output any event. Thus, no insertions are made to queue 410.

(10) Next, coordinator 400 executes Entity 5 from the front of queue 410 (e.g., subprocess 350). This execution of Entity 5 does not output any event. Thus, no insertions are made to queue 410.

(11) Next, coordinator 400 executes Entity 5 from the front of queue 410 (e.g., subprocess 350). This execution of Entity 5 does not output any event. Thus, no insertions are made to queue 410. In addition, after this execution, queue 410 is empty (e.g., "Yes" in subprocess 340) and no events remain in recording 200 (e.g., "No" in subprocess 310). Thus, coordinator 400 has completed the replay of recording 200 (e.g., process 300 ends).

2.2.2. Second Variant of First Embodiment

FIG. 4B illustrates the operation of algorithm 300, according to a second variant of the queuing strategy. In this second variant, coordinator 400 inserts each newly stimulated software entity at the back of queue 410, unless the software entity already exists at another position in queue 410, in which case the software entity is not inserted into queue 410 so as not to duplicate the software entity in queue 410. Accordingly, coordinator 400 replays recording 200 as follows:

(1) Initially, Event A is played from recording 200 (e.g., subprocess 320). In other words, coordinator 400 sends Event A. Event A stimulates Entity 1 and Entity 2. Thus, coordinator 400 inserts Entity 1 and Entity 2 into queue 410 (e.g., subprocess 330).

(2) Next, coordinator 400 executes Entity 1 from the front of queue 410 (e.g., subprocess 350). As a result of this execution, Entity 1 outputs Event B and Event C, which are played (e.g., subprocess 360). In other words, Event B and Event C are sent as messages. Event B stimulates Entity 3 and Entity 5. Event C stimulates Entity 4. Thus, coordinator 400 inserts Entity 3, Entity 5, and Entity 4 at the back of queue 410 (e.g., subprocess 330).

(3) Next, coordinator 400 executes Entity 2 from the front of queue 410 (e.g., subprocess 350). As a result of this execution, Entity 2 outputs Event D, which is played (e.g., subprocess 360). In other words, Event D is sent as a message. Event D stimulates Entity 4 and Entity 5. However, Entity 4 and Entity 5 already exist in queue 410. Thus, no insertions are made to queue 410.

(4) Next, coordinator 400 executes Entity 3 from the front of queue 410 (e.g., subprocess 350). As a result of this execution, Entity 3 outputs Event E, which is played (e.g., subprocess 360). In other words, Event E is sent as a message. Event E stimulates Entity 5. However, Entity 5 already exists in queue 410. Thus, no insertions are made to queue 410.

(5) Next, coordinator 400 executes Entity 5 from the front of queue 410 (e.g., subprocess 350). This execution of Entity 5 does not output any event. Thus, no insertions are made to queue 410.

(6) Next, coordinator 400 executes Entity 4 from the front of queue 410 (e.g., subprocess 350). As a result of this execution, Entity 4 outputs Event F, which is played (e.g., subprocess 360). In other words, Event F is sent as a message. Event F stimulates Entity 5. Thus, coordinator 400 inserts Entity 5 at the back of queue 410 (e.g., subprocess 330).

(7) Next, coordinator 400 executes Entity 5 from the front of queue 410 (e.g., subprocess 350). This execution of Entity 5 does not output any event. Thus, no insertions are made to queue 410. In addition, after this execution, queue 410 is empty (e.g., "Yes" in subprocess 340) and no events remain in recording 200 (e.g., "No" in subprocess 310). Thus, coordinator 400 has completed the replay of recording 200 (e.g., process 300 ends).

2.2.3. Third Variant of First Embodiment

FIG. 4C illustrates the operation of algorithm 300, according to a third variant of the queuing strategy. In this third variant, coordinator 400 inserts each newly stimulated software entity at the front of queue 410, unless the software entity already exists at another position in queue 410, in which case the software entity is not inserted into queue 410 so as not to duplicate the software entity in queue 410. Accordingly, coordinator 400 replays recording 200 as follows:

(1) Initially, Event A is played from recording 200 (e.g., subprocess 320). In other words, coordinator 400 sends Event A. Event A stimulates Entity 1 and Entity 2. Thus, coordinator 400 inserts Entity 1 and Entity 2 into queue 410 (e.g., subprocess 330).

(2) Next, coordinator 400 executes Entity 1 from the front of queue 410 (e.g., subprocess 350). As a result of this execution, Entity 1 outputs Event B and Event C, which are played (e.g., subprocess 360). In other words, Event B and Event C are sent as messages. Event B stimulates Entity 3 and Entity 5. Event C stimulates Entity 4. Thus, coordinator 400 inserts Entity 3, Entity 5, and Entity 4 at the front of queue 410 (e.g., subprocess 330).

(3) Next, coordinator 400 executes Entity 3 from the front of queue 410 (e.g., subprocess 350). As a result of this execution, Entity 3 outputs Event E, which is played (e.g., subprocess 360). In other words, Event E is sent as a message. Event E stimulates Entity 5. However, Entity 5 already exists in queue 410. Thus, no insertions are made to queue 410.

(4) Next, coordinator 400 executes Entity 5 from the front of queue 410 (e.g., subprocess 350). This execution of Entity 5 does not output any event. Thus, no insertions are made to queue 410.

(5) Next, coordinator 400 executes Entity 4 from the front of queue 410 (e.g., subprocess 350). As a result of this execution, Entity 4 outputs Event F, which is played (e.g., subprocess 360). In other words, Event F is sent as a message. Event F stimulates Entity 5. Thus, coordinator 400 inserts Entity 5 at the front of queue 410 (e.g., subprocess 330).

(6) Next, coordinator 400 executes Entity 5 from the front of queue 410 (e.g., subprocess 350). This execution of Entity 5 does not output any event. Thus, no insertions are made to queue 410.

(7) Next, coordinator 400 executes Entity 2 from the front of queue 410 (e.g., subprocess 350). As a result of this execution, Entity 2 outputs Event D, which is played (e.g., subprocess 360). In other words, Event D is sent as a message. Event D stimulates Entity 4 and Entity 5. Thus, coordinator 400 inserts Entity 4 and Entity 5 at the front of queue 410 (e.g., subprocess 330).

(8) Next, coordinator 400 executes Entity 4 from the front of queue 410 (e.g., subprocess 350). As a result of this execution, Entity 4 outputs Event F, which is played (e.g., subprocess 360). In other words, Event F is sent as a message. Event F stimulates Entity 5. However, Entity 5 already exists in queue 410. Thus, no insertions are made to queue 410.

(9) Next, coordinator 400 executes Entity 5 from the front of queue 410 (e.g., subprocess 350). This execution of Entity 5 does not output any event. Thus, no insertions are made to queue 410. In addition, after this execution, queue 410 is empty (e.g., "Yes" in subprocess 340) and no events remain in recording 200 (e.g., "No" in subprocess 310). Thus, coordinator 400 has completed the replay of recording 200 (e.g., process 300 ends).

2.3. Second Embodiment of Algorithm

Figure 5:
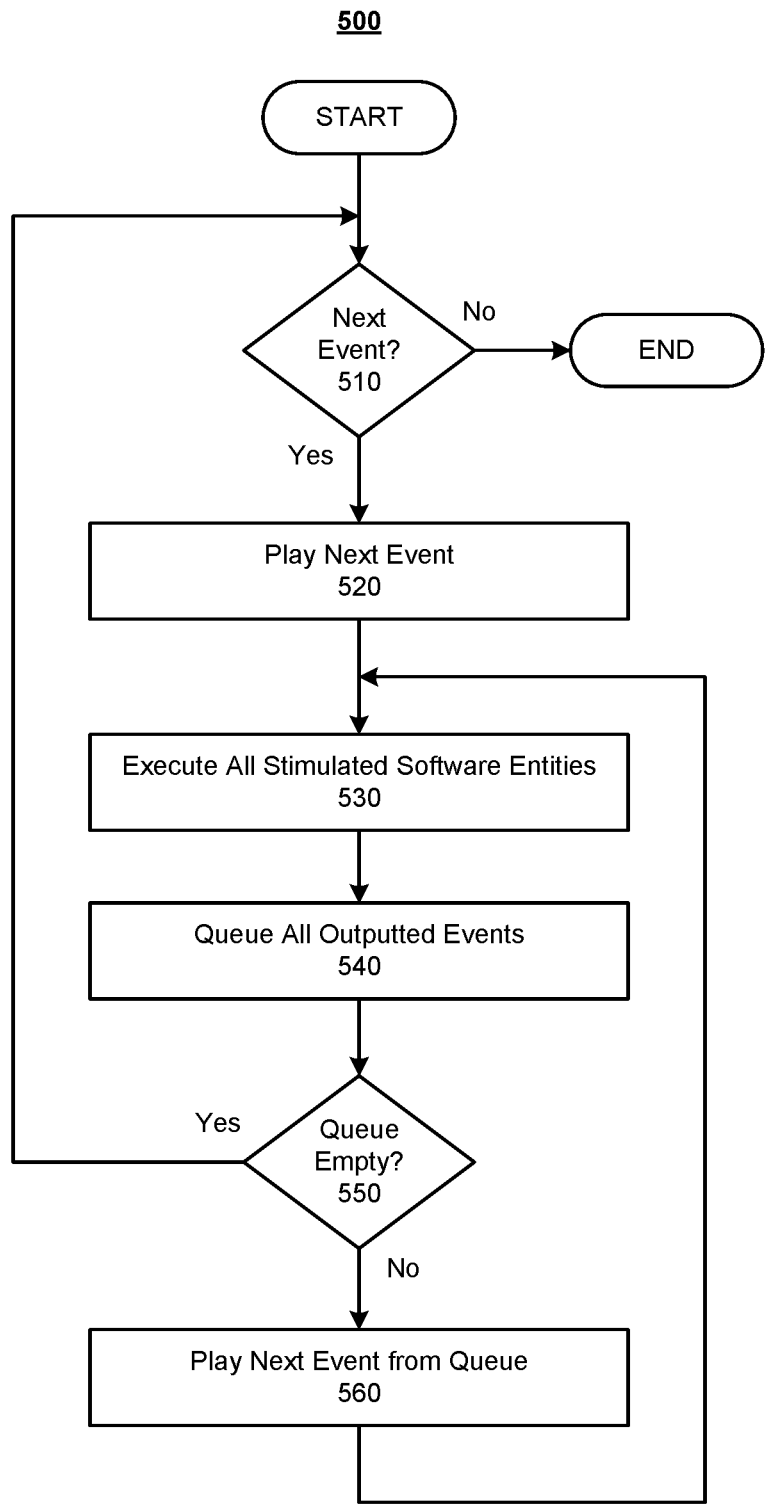
FIG. 5 illustrates an algorithm for replaying data by queuing events, according to a second embodiment.

FIG. 5 illustrates an algorithm 500 for replaying data by queueing events, according to a second embodiment. It should be understood that algorithm 500 may be executed by a coordinator that coordinates the execution of the software entities and playing of events (e.g., sending events to the software entities), and manages a queue of the outputted events. The coordinator may be executed by one or more processors 110 of a system 100 that is the same as, or communicates with, system 250 executing the software entities. As discussed above with respect to algorithm 300, the coordinator may learn the topology of the system to be replayed.

In subprocess 510, algorithm 500 determines whether or not there is a next event to replay. When there is a next event to replay (i.e., "Yes" in subprocess 510), algorithm 500 plays the next event in subprocess 520. Otherwise, if there is no next event to replay (i.e., "No" in subprocess 510), algorithm 500 may end. Subprocess 510 may be similar or identical to subprocess 310, and therefore, will not be redundantly described herein. It should be understood that any description of subprocess 310 may apply equally to subprocess 510, and vice versa.

In subprocess 520, algorithm 500 plays the next event. Subprocess 520 may be similar or identical to subprocess 320, and therefore, will not be redundantly described herein. It should be understood that any description of subprocess 320 may apply equally to subprocess 520, and vice versa.

In subprocess 530, algorithm 500 executes all software entities (if any) that are stimulated by the event played in subprocess 520. It should be understood that zero, one, or a plurality of software entities may be stimulated by the event played in subprocess 520. In particular, each software entity that consumes the event is executed to process the event as an input. For example, the software entity may parse the data in a message representing the input event, and process that data to produce one or more output events. Each of these output event(s) may be represented as another message that is sent to one or more other software entities. In subprocess 530, the stimulated software entities may be executed in parallel or serially. The coordinator may control execution of any given software entity in system 250 by calling or otherwise triggering the software entity using the input event(s), and may receive the output events in response.

In subprocess 540, algorithm 500 adds all of the event(s) (if any), outputted by the software entities executed in subprocess 530, to a queue. It should be understood that this does not require the actual event (e.g., message) to be added to a queue. Rather, when an event is discussed herein as being added or inserted into a queue, this encompasses a situation in which an identifier of the event or reference to the event is added or inserted into the queue. The events may be added to the queue according to various strategies. A few of these strategies are discussed below, with reference to FIGS. 6A-6C, as variants of the second embodiment. The key point is that the queue provides a reproducible ordering of the outputted events. It should also be understood that, in some cases, the software entities, executed in subprocess 530, will not output any events, such that no events are inserted into the queue in subprocess 540.

In subprocess 550, algorithm 500 determines whether or not the queue is empty, or conversely, whether or not there are any events remaining in the queue. If the queue is empty (i.e., "Yes" in subprocess 550), algorithm 500 returns to subprocess 510 to determine whether or not any events remain in the recording. Otherwise, if at least one event remains in the queue (i.e., "No" in subprocess 550), algorithm 500 removes the next event in the queue and plays that next event in subprocess 560 (e.g., by sending a message representing the event to one or more software entities). For example, the event may be specifically forwarded to one or more software entities, or may be broadcast to a plurality of software entities. Then, algorithm 500 returns to subprocess 530 to execute any software entities that are stimulated by the event sent in subprocess 560.

In summary, in this second embodiment, represented by algorithm 500, the events that are outputted by the software entities are queued. The order in which events are queued may be implemented according to a variety of strategies, as long as the same order will be reproduced in every replay. When an event from the queue is sent, all of the software entities stimulated by the event may be executed in parallel, and the events output by the stimulated software entities are queued according to the chosen strategy. In an embodiment, the execution of all software entities must be completed (e.g., subprocess 530) before playing (e.g., sending) the next event from the queue (e.g., in subprocess 520 or 560). When sending events, either only a single event is forwarded at a time, or all events produced by the execution of a software entity are forwarded all at once, depending on the strategy. When the queue is empty, the coordinator triggers the replay of the next event from the recording.

Figure 6A:
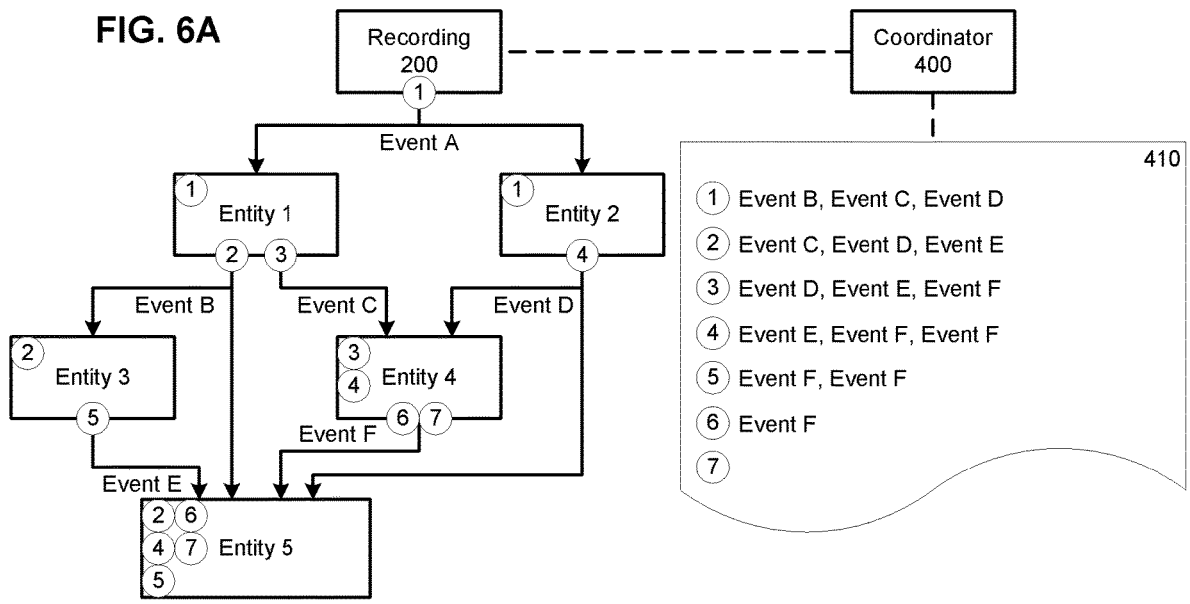
Figure 6B:
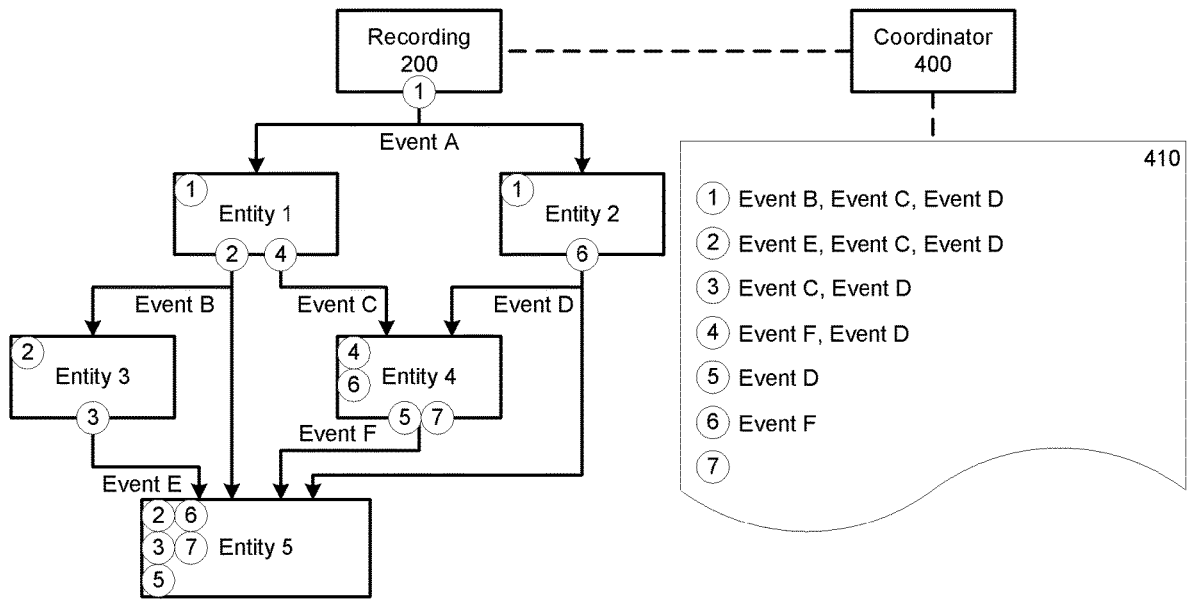

Variations in the strategies for adding events to the queue, in algorithm 500, are illustrated in FIGS. 6A-6C. However, it should be understood that these strategies are non-limiting examples, and that other strategies are possible.

2.3.1. First Variant of Second Embodiment

FIG. 6A illustrates the operation of algorithm 500, according to a first variant of the queuing strategy. In this first variant, coordinator 400 inserts each newly output event at the back of queue 410, and sends only one event at a time. Accordingly, coordinator 400 replays recording 200 as follows:

(1) Initially, Event A is played from recording 200 (e.g., subprocess 520). In other words, coordinator 400 sends Event A. Event A stimulates Entity 1 and Entity 2. Consequently, Entity 1 and Entity 2 execute (e.g., subprocess 530) to, collectively, output Event B, Event C, and Event D. Thus, coordinator 400 inserts Event B, Event C, and Event D into queue 410 (e.g., subprocess 540).

(2) Next, Event B is played from the front of queue 410 (e.g., subprocess 560). In other words, Event B is sent as a message. Event B stimulates Entity 3 and Entity 5. Consequently, Entity 3 and Entity 5 execute (e.g., subprocess 530) to, collectively, output Event E. Thus, coordinator 400 inserts Event E at the back of queue 410 (e.g., subprocess 540).

(3) Next, Event C is played from the front of queue 410 (e.g., subprocess 560). In other words, Event C is sent as a message. Event C stimulates Entity 4. Consequently, Entity 4 executes (e.g., subprocess 530) to output Event F. Thus, coordinator 400 inserts Event F at the back of queue 410 (e.g., subprocess 540).

(4) Next, Event D is played from the front of queue 410 (e.g., subprocess 560). In other words, Event D is sent as a message. Event D stimulates Entity 4 and Entity 5. Consequently, Entity 4 and Entity 5 execute (e.g., subprocess 530) to, collectively, output Event F. Thus, coordinator 400 inserts Event F at the back of queue 410 (e.g., subprocess 540).

(5) Next, Event E is played from the front of queue 410 (e.g., subprocess 560). In other words, Event E is sent as a message. Event E stimulates Entity 5. Consequently, Entity 5 executes (e.g., subprocess 530), but does not output any event. Thus, no insertions are made into queue 410.

(6) Next, Event F is played from the front of queue 410 (e.g., subprocess 560). In other words, Event F is sent as a message. Event F stimulates Entity 5. Consequently, Entity 5 executes (e.g., subprocess 530), but does not output any event. Thus, no insertions are made into queue 410.

(7) Next, Event F is played from the front of queue 410 (e.g., subprocess 560). In other words, Event F is sent as a message. Event F stimulates Entity 5. Consequently, Entity 5 executes (e.g., subprocess 530), but does not output any event. Thus, no insertions are made into queue 410. In addition, after this execution, queue 410 is empty (e.g., "Yes" in subprocess 550) and no events remain in recording 200 (e.g., "No" in subprocess 510). Thus, coordinator 400 has completed the replay of recording 200 (e.g., process 500 ends).

2.3.2. Second Variant of Second Embodiment

FIG. 6B illustrates the operation of algorithm 500, according to a second variant of the queueing strategy. In this second variant, coordinator 400 inserts each newly output event at the front of queue 410, and plays (e.g., sends) only one event at a time. Accordingly, coordinator 400 replays recording 200 as follows:

(1) Initially, Event A is played from recording 200 (e.g., subprocess 520). In other words, coordinator 400 sends Event A. Event A stimulates Entity 1 and Entity 2. Consequently, Entity 1 and Entity 2 execute (e.g., subprocess 530) to, collectively, output Event B, Event C, and Event D. Thus, coordinator 400 inserts Event B, Event C, and Event D into queue 410 (e.g., subprocess 540).

(2) Next, Event B is played from the front of queue 410 (e.g., subprocess 560). In other words, Event B is sent as a message. Event B stimulates Entity 3 and Entity 5. Consequently, Entity 3 and Entity 5 execute (e.g., subprocess 530) to, collectively, output Event E. Thus, coordinator 400 inserts Event E at the front of queue 410 (e.g., subprocess 540).

(3) Next, Event E is played from the front of queue 410 (e.g., subprocess 560). In other words, Event E is sent as a message. Event E stimulates Entity 5. Consequently, Entity 5 executes (e.g., subprocess 530), but does not output any event. Thus, no insertions are made into queue 410.

(4) Next, Event C is played from the front of queue 410 (e.g., subprocess 560). In other words, Event C is sent as a message. Event C stimulates Entity 4. Consequently, Entity 4 executes (e.g., subprocess 530) to output Event F. Thus, coordinator 400 inserts Event F at the front of queue 410 (e.g., subprocess 540).

(5) Next, Event F is played from the front of queue 410 (e.g., subprocess 560). In other words, Event F is sent as a message. Event F stimulates Entity 5. Consequently, Entity 5 executes (e.g., subprocess 530), but does not output any event. Thus, no insertions are made into queue 410.

(6) Next, Event D is played from the front of queue 410 (e.g., subprocess 560). In other words, Event D is sent as a message. Event D stimulates Entity 4 and Entity 5. Consequently, Entity 4 and Entity 5 execute (e.g., subprocess 530) to, collectively, output Event F. Thus, coordinator 400 inserts Event F at the front of queue 410 (e.g., subprocess 540).

(7) Next, Event F is played from the front of queue 410 (e.g., subprocess 560). In other words, Event F is sent as a message. Event F stimulates Entity 5. Consequently, Entity 5 executes (e.g., subprocess 530), but does not output any event. Thus, no insertions are made into queue 410. In addition, after this execution, queue 410 is empty (e.g., "Yes" in subprocess 550) and no events remain in recording 200 (e.g., "No" in subprocess 510). Thus, coordinator 400 has completed the replay of recording 200 (e.g., process 500 ends).

2.3.3. Third Variant of Second Embodiment

FIG. 6C illustrates the operation of algorithm 500, according to a third variant of the queuing strategy. In this third variant, coordinator 400 inserts each newly output event at the front of queue 410, and simultaneously plays (e.g., sends) all events output by a given software entity. Accordingly, coordinator 400 replays recording 200 as follows:

(1) Initially, Event A is played from recording 200 (e.g., subprocess 520). In other words, coordinator 400 sends Event A. Event A stimulates Entity 1 and Entity 2. Consequently, Entity 1 and Entity 2 execute (e.g., subprocess 530). Entity 1 outputs Event B and Event C, and Entity 2 outputs Event D. Thus, coordinator 400 inserts Event B+C and Event D into queue 410 (e.g., subprocess 540). Notably, Event B and C are added as a collective event to a single position in queue 410, since they were both output by a single software entity (i.e., Entity 1).

(2) Next, Event B+C is played from the front of queue 410 (e.g., subprocess 560). In other words, Event B and Event C are sent simultaneously as messages. Event B stimulates Entity 3 and Entity 5, and Event C stimulates Entity 4. Consequently, Entity 3, Entity 4, and Entity 5 execute (e.g., subprocess 530). Entity 3 outputs Event E, Entity 4 outputs Event F, and Entity 5 does not output any event. Thus, coordinator 400 inserts Event E and Event F at the front of queue 410 (e.g., subprocess 540).

(3) Next, Event E is played from the front of queue 410 (e.g., subprocess 560). In other words, Event E is sent as a message. Event E stimulates Entity 5. Consequently, Entity 5 executes (e.g., subprocess 530), but does not output any event. Thus, no insertions are made into queue 410.

(4) Next, Event F is played from the front of queue 410 (e.g., subprocess 560). In other words, Event F is sent as a message. Event F stimulates Entity 5. Consequently, Entity 5 executes (e.g., subprocess 530), but does not output any event. Thus, no insertions are made into queue 410.

(5) Next, Event D is played from the front of queue 410 (e.g., subprocess 560). In other words, Event D is sent as a message. Event D stimulates Entity 4 and Entity 5. Consequently, Entity 4 and Entity 5 execute (e.g., subprocess 530). Entity 4 outputs Event F, and Entity 5 does not output any event. Thus, coordinator 400 inserts Event F at the front of queue 410 (e.g., subprocess 540).

(6) Next, Event F is played from the front of queue 410 (e.g., subprocess 560). In other words, Event F is sent as a message. Event F stimulates Entity 5. Consequently, Entity 5 executes (e.g., subprocess 530), but does not output any event. Thus, no insertions are made into queue 410. In addition, after this execution, queue 410 is empty (e.g., "Yes" in subprocess 550) and no events remain in recording 200 (e.g., "No" in subprocess 510). Thus, coordinator 400 has completed the replay of recording 200 (e.g., process 500 ends).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to deterministically replay a recording of events, between a plurality of software entities within a sensor or control system of a vehicle or robot, in which the plurality of software entities represent nodes in a graph and events represent edges in the graph, by, for each of one or more events in the recording:
    play the event;
    enqueue any of the plurality of software entities, that are stimulated by the event, into a queue; and,
    until the queue is empty,
        remove and execute a software entity at a front of the queue,
        play all events outputted by the executed software entity, and
        enqueue any of the plurality of software entities, that are stimulated by the played events outputted by the executed software entity, into the queue,
    wherein no events are played during execution of any of the plurality of software entities, and no software entity is executed during execution of any other one of the plurality of software entities.

2. The method of claim 1, wherein each playing of each event comprises sending a message representing the event to one or more of the plurality of software entities.

3. The method of claim 1, wherein each enqueuing of a software entity into the queue comprises inserting the software entity into the queue, regardless of whether or not the software entity already exists at a position within the queue.

4. The method of claim 3, wherein inserting the software entity into the queue comprises inserting the software entity at a back of the queue.

5. The method of claim 3, wherein inserting the software entity into the queue comprises inserting the software entity at the front of the queue.

6. The method of claim 1, wherein the sensor or control system is of a vehicle.

7. The method of claim 1, wherein the sensor or control system is of a robot.

8. A method comprising using at least one hardware processor to deterministically replay a recording of events, between a plurality of software entities within a sensor or control system of a vehicle or robot, in which the plurality of software entities represent nodes in a graph and events represent edges in the graph, by, for each of one or more events in the recording:
    play the event;
    execute any of the plurality of software entities that are stimulated by the event;
    enqueue all events, outputted by any of the executed software entities, into a queue; and,
    until the queue is empty,
        remove and play an event at a front of the queue,
        execute any of the plurality of software entities that are stimulated by the played event that was removed from the front of the queue, and
        enqueue all events, outputted by any of the executed software entities that are stimulated by the played event that was removed from the front of the queue, into the queue,
    wherein no events are played during execution of any of the plurality of software entities, and no software entity is executed during execution of any other one of the plurality of software entities.

9. The method of claim 8, wherein each playing of each event comprises sending a message representing the event to one or more of the plurality of software entities.

10. The method of claim 8, wherein each enqueuing of an event into the queue comprises inserting the event into the queue, regardless of whether or not the event already exists at a position within the queue.

11. The method of claim 8, wherein the sensor or control system is of a vehicle.

12. The method of claim 8, wherein the sensor or control system is of a robot.

13. A non-transitory computer-readable medium having instructions stored therein, wherein the instructions, when executed by a processor, cause the processor to deterministically replay a recording of events, between a plurality of software entities within a sensor or control system of a vehicle or robot, in which the plurality of software entities represent nodes in a graph and events represent edges in the graph, by, for each of one or more events in the recording:
play the event;
execute any of the plurality of software entities that are stimulated by the event;
enqueue all events, outputted by any of the executed software entities, into a queue; and,
until the queue is empty,
remove and play an event at a front of the queue,
execute any of the plurality of software entities that are stimulated by the played event that was removed from the front of the queue, and
enqueue all events, outputted by any of the executed software entities that are stimulated by the played event that was removed from the front of the queue, into the queue,
wherein no events are played during execution of any of the plurality of software entities, and no software entity is executed during execution of any other one of the plurality of software entities.

14. The non-transitory computer-readable medium of claim 13, wherein each playing of each event comprises sending a message representing the event to one or more of the plurality of software entities.

15. The non-transitory computer-readable medium of claim 13, wherein each enqueuing of an event into the queue comprises inserting the event into the queue, regardless of whether or not the event already exists at a position within the queue.

* * * * *